C. Hoeller,

Stove Pipe.

No. 3,934. Reissued Apr. 26, 1870.

Witnesses;

C. L. Fisher.

Samuel Russell.

Inventor,

C. Hoeller

UNITED STATES PATENT OFFICE.

C. HOELLER, OF CINCINNATI, OHIO, ASSIGNOR TO HIMSELF AND HENRY SAMUEL HOELLER, OF SAME PLACE.

IMPROVEMENT IN STOVE-PIPE ELBOWS.

Specification forming part of Letters Patent No. 82,407, dated September 22, 1868; reissue No. 3,934, dated April 26, 1870.

I, C. HOELLER, of Cincinnati, in the county of Hamilton and State of Ohio, have invented a new and useful Improvement in Stove-Pipe and other Elbows, of which the following is a specification:

The nature of my invention consists in forming the elbow of one piece of sheet metal, having its surface of smallest curvature corrugated or ribbed, and the surface of largest curvature smooth.

Figure 1:
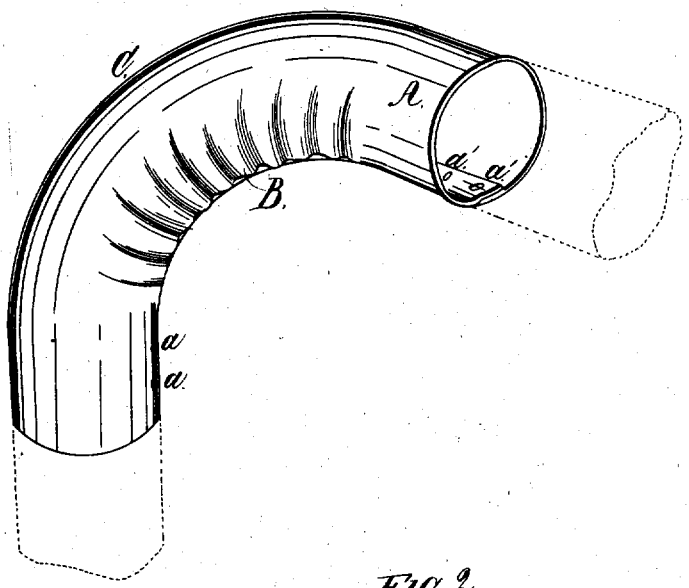
Figure 2:
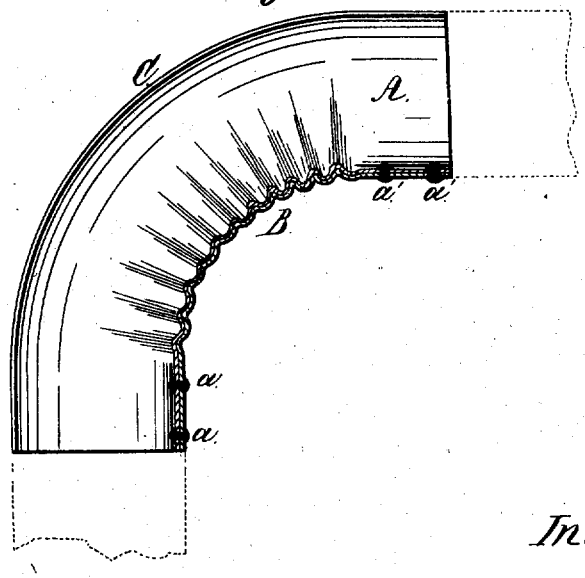

Figure 1 represents, in perspective, my improved stove-pipe and other elbow. Fig. 2 is a longitudinal section of the same.

A is the elbow. shaped to connect pipes which make an angle with each other. The surface of smallest curvature, B, is corrugated or ribbed, while the surface of greatest curvature, C, is smooth. The corrugations or ribs extend radially about the surface of smallest curvature over one-half of the surface of the elbow, gradually decreasing in depth toward the smooth surface C. *a a'* are rivets, of which two or more are used at each end of the elbow for securing the "lap." The riveting is done before the elbow is shaped. Intermediate rivets may be used in the "lap" between the extreme rivets *a a'*. When the elbow is constructed the surplus metal in the surface of its smallest curvature is buckled outwardly, forming the exterior corrugations or ribs.

Much time is saved in this construction of the elbow over the mode now employed, by means of crimping together a series of cylindrical sections of sheet metal. In my improved elbow but one piece of metal is used.

I claim as my invention-

The stove-pipe and other elbows, constructed as herein shown and described, as a new article of manufacture.

C. HOELLER.

Witnesses:
H. P. LORD,
C. L. FISHER.